(12) United States Patent
Allen et al.

(10) Patent No.: US 11,199,181 B2
(45) Date of Patent: Dec. 14, 2021

(54) CONTINUOUS PRODUCTION OF MUSCLE FIBERS

(71) Applicant: Lintec of America, Inc., Richardson, TX (US)

(72) Inventors: Randy Allen, Richardson, TX (US); Marcio Dias Lima, Richardson, TX (US); Sergey Li, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 187 days.

(21) Appl. No.: 16/486,205

(22) PCT Filed: Feb. 22, 2018

(86) PCT No.: PCT/US2018/019225
§ 371 (c)(1),
(2) Date: Aug. 15, 2019

(87) PCT Pub. No.: WO2018/156761
PCT Pub. Date: Aug. 30, 2018

(65) Prior Publication Data
US 2020/0003189 A1 Jan. 2, 2020

Related U.S. Application Data

(60) Provisional application No. 62/462,527, filed on Feb. 23, 2017.

(51) Int. Cl.
*F03G 7/06* (2006.01)
*D01H 4/40* (2006.01)

(52) U.S. Cl.
CPC ............... *F03G 7/06* (2013.01); *D01H 4/40* (2013.01)

(58) Field of Classification Search
CPC .................................. F03G 7/06; D01H 4/40
(Continued)

(56) References Cited

U.S. PATENT DOCUMENTS 3,296,050 A * 1/1967 Marzocchi ............... F16G 5/00
156/171
3,393,556 A * 7/1968 Dhosi ................... G01L 1/2287
73/775
(Continued)

FOREIGN PATENT DOCUMENTS

CN 104769834 7/2015
JP 55-51826 A 4/1980
(Continued)

OTHER PUBLICATIONS

Office Action issued in corresponding Taiwanese Patent Application No. 107106182, dated Apr. 14, 2020 (7 pages).
(Continued)

*Primary Examiner* — Hoang M Nguyen
(74) *Attorney, Agent, or Firm* — Greenblum & Bernstein, P.L.C.

(57) ABSTRACT

Methods, system, and apparatus for producing an actuator device are disclosed. The method may include twisting a muscle fiber; coiling the twisted muscle fiber about a mandrel; securing the muscle fiber onto the mandrel using a securing means; heating the muscle fiber to a predetermined temperature using a heating means; and removing the coiled muscle fiber from the mandrel. The twisting, coiling, securing, heating, and removing is a process that is continued until the muscle fiber is a desired length.

16 Claims, 5 Drawing Sheets

(58) Field of Classification Search
    USPC .................................................. 60/527–529
    See application file for complete search history.

(56) References Cited

U.S. PATENT DOCUMENTS

| | | | | |
|---|---|---|---|---|
| 8,563,136 | B2* | 10/2013 | Yang ........................ | H01J 1/304 428/408 |
| 2008/0170982 | A1* | 7/2008 | Zhang .................... | D01F 9/1273 423/447.3 |
| 2010/0308489 | A1* | 12/2010 | Feng ........................ | C01B 32/15 264/105 |
| 2015/0219078 | A1 | 8/2015 | Li et al. | |
| 2017/0035550 | A1 | 2/2017 | Hiraoka et al. | |

FOREIGN PATENT DOCUMENTS

| | | |
|---|---|---|
| JP | 60-17609 B2 | 5/1985 |
| JP | 2015-533521 A | 11/2015 |
| WO | 2014/022667 A2 | 2/2014 |
| WO | 2016/064220 A1 | 4/2016 |

OTHER PUBLICATIONS

International Search Report issued in PCT/US2018/019225 dated Apr. 16, 2018 (3 pages).
Written Opinion issued in PCT/US2018/019225 dated Apr. 16, 2018 (4 pages).
Taiwanese Official Action received in Patent Application No. 107106182, with appended Search Report, dated Jan. 25, 2021.
Japan Notice of Reasons for Rejection received in Application No. 2019-562253, dated Aug. 31, 2020 and English language translation.
International Preliminary Report on Patentability issued in PCT/US2018/019225 dated Aug. 27, 2019 (5 pages).
Carter S. Haines et al. "Supplementary Materials for Artificial Muscles from Fishing Line and Sewing Thread", published Feb. 21, 2014, pp. 1-33 and appended pp. 1-3.

* cited by examiner

CONTINUOUS PRODUCTION OF MUSCLE FIBERS

CROSS REFERENCE TO RELATED APPLICATIONS

This Application claims priority, pursuant to 35 U.S.C. § 119(e) to U.S. Provisional Application 62/462,527, filed on Feb. 23, 2017, and which is incorporated by reference in its entirety.

The material of the following applications may be used in conjunction with embodiments disclosed herein: U.S. Provisional Application No. 62/588,034, entitled "HOLLOW CARBON NANOTUBE ARTIFICIAL MUSCLE ACTUATING DEVICE," filed on Nov. 17, 2017; U.S. Provisional Application No. 62/590,121, entitled "EMBEDDED CONDUCTIVE WIRES IN POLYMER ARTIFICIAL MUSCLE ACTUATING DEVICES," filed on Nov. 22, 2017. U.S. Provisional Application No. 62/597,205, entitled "CARBON NANOTUBE ARTIFICIAL MUSCLE VALVE," filed on Dec. 11, 2017; WIPO Application No. PCT/US2017/030199, filed on Apr. 28, 2017; as well as U.S. Provisional Application No. 62/577,512, filed on Oct. 26, 2017 and entitled "SHEET WRAPPING MUSCLES." These applications are hereby incorporated by reference in their entirety.

FIELD OF INVENTION

The present invention relates to the fabrication of artificial muscle actuators.

BACKGROUND

Thermally driven torsional actuators based on twisted polymeric and carbon nanotube (CNT) fibers and yarns have a wide range of applications. Artificial muscle actuators comprising twisted and/or coiled polymers have the advantage of low cost, high production volume, and design simplicity. Artificial muscle actuators may have advantages over small motors because of the greatly simplified engineering and lower product costs.

SUMMARY

In one aspect, embodiments disclosed herein relate to a method of producing an actuator device that includes twisting a muscle fiber; coiling the twisted muscle fiber about a mandrel; securing the muscle fiber onto the mandrel using a securing means; heating the muscle fiber to a predetermined temperature using a heating means; and removing the coiled muscle fiber from the mandrel. The twisting, coiling, securing, heating, and removing is a process that is continued until the muscle fiber is a desired length.

In another aspect, embodiments disclosed herein relate to a system for continuous manufacturing of an actuator device that includes a mandrel operably connected to a motor; a securing means; and a heating means. A twisted muscle fiber is coiled around the mandrel using the motor and secured by the securing means, and the heating means heats the muscle fiber to a predetermined temperature.

In another aspect, embodiments disclosed herein relate to an apparatus for continuously coiling artificial muscles that includes an arbor spool and an arbor wire that is wound around the arbor spool. The arbor spool releases the arbor wire at a rate in a rate range of 1 cm/min and 50 cm/min. The apparatus also includes a first motor that rotates the arbor spool and an arbor tension sensor that: measures tension on the arbor wire as the arbor wire is released out of the arbor spool, and automatically adjusts the tension on the arbor wire in response to sensing that the tension on the arbor wire is out of the load range. The apparatus further includes a plurality of pulleys that apply the tension on the arbor wire; a precursor muscle fiber that may include a core fiber and a conductive wire twisted and wrapped around the core fiber; a muscle spool that holds the precursor muscle fiber, where a round-per-minute rate of the muscle spool is proportional to a velocity of the arbor wire divided by a diameter of the precursor muscle fiber. The apparatus includes a second motor that pulls the precursor muscle fiber from the muscle spool and a muscle tensioner that maintains tension on the precursor muscle fiber as the precursor muscle fiber is being wound around the arbor wire, where the tension on the precursor muscle fiber is in a tension range of 1 N to 50 N. The apparatus also includes a coil spool that holds the arbor wire after the precursor muscle fiber that has been wrapped around the arbor wire; a third motor that rotates the coil spool; a linear stage actuator that moves the coil spool back and forth and evenly places the arbor wire along a width of the coil spool; and an oven or a furnace for annealing the coil spool along with the precursor muscle fiber wrapped around the arbor wire. The core fiber may be a twisted core fiber or an untwisted core fiber.

In another aspect, embodiments disclosed herein include a method for manufacturing a coiled muscle that includes pulling an arbor wire from an arbor spool; passing the arbor wire around a pulley and through an arbor tension transducer that measures a tension of the arbor wire; and pulling a precursor muscle fiber from a muscle spool and through a tensioner. The precursor muscle fiber may include a core fiber and a conductive wire wrapped around the core fiber. The method further includes wrapping the precursor muscle fiber around the arbor wire that has passed the arbor tension transducer to produce a coiled muscle fiber; winding the coiled muscle fiber onto a coil spool; annealing the coiled muscle fiber around the coil spool in an oven or a furnace; removing the coiled muscle fiber around the coil spool from the oven or the furnace; and removing the arbor wire from the coiled muscle fiber to create a coiled muscle. The core fiber may be a twisted core fiber or an untwisted core fiber, and a round-per-minute rate of the muscle spool may be proportional to a velocity of the arbor wire divided by a diameter of the precursor muscle fiber.

Other aspects and advantages of the invention will be apparent from the following description and the appended claims.

BRIEF DESCRIPTION OF DRAWINGS

Certain embodiments of the disclosure will hereafter be described with reference to the accompanying drawings, where like reference numerals denote like elements. It should be understood, however, that the accompanying figures illustrate the various implementations described herein and are not meant to limit the scope of various technologies described herein.

DETAILED DESCRIPTION

Figure 1:
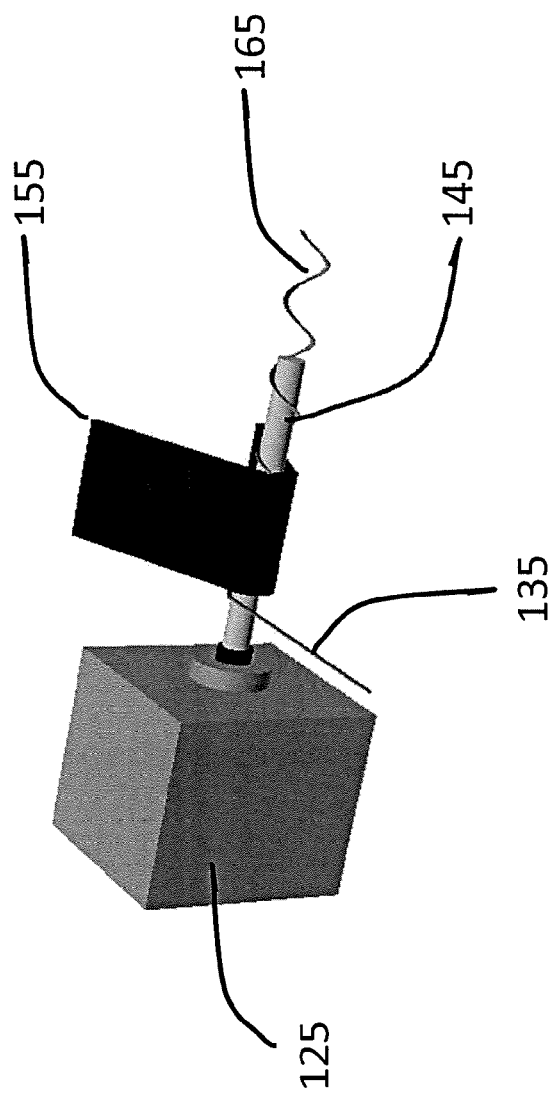
FIG. 1 shows a diagram in accordance with one or more embodiments of the invention.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to improvements in the fabrication of artificial muscle actuators. In the embodiments disclosed herein, the actuators may include one or more fibers that are thermally driven. The actuators may include a conductive material so that the actuation may be stimulated electrically.

Embodiments of the invention may include actuator materials, or artificial muscles, including twist-spun nanofiber yarn and twisted polymer fibers that may generate torsional and/or tensile actuation when powered electrically, photonically, thermally, chemically, by absorption, or by other means. Embodiments of the invention may include actuators that utilize coiled yarns or polymer fibers and may be either neat or include a guest. The guest may be a guest actuation material that, for example, infiltrates at least one carbon nanotube (CNT) sheets and enables actuation of the artificial muscle.

An artificial muscle device may also be referred to as a sheet muscle device, a hybrid nanofiber artificial muscle, a hybrid muscle device, a hybrid actuator, an artificial muscle actuator, or the like.

A mandrel may be understood to be, among other things, any form around which artificial muscle fibers or yarns may be wrapped. A mandrel may be rigid or flexible.

Coiling a precursor muscle fiber by hand may be time consuming. Coiling by hand requires the precursor muscle fiber to be manually held in a place while a mandrel rotates and shifts. Therefore, manual coiling can only produce short pieces of coiled muscles. In general, embodiments of the invention relate to an apparatus and a method for producing coiled muscles from precursor muscle fibers, continuously and automatically.

In one or more embodiments, an overtwisting process may be used to produce a coiled fiber by inserting a twist into the artificial muscle fiber until the fiber coils upon itself. Although a simple process, overtwisting may have the following properties. First, only homochiral (coiling direction in same direction as twist of the artificial muscle fiber) fibers may be produced, because the process requires that the initial twisting and the overtwisting be done in only one direction. Second, it may be difficult to maintain good quality control using overtwisting. Third, continuous production may be dependent upon the speed of the motor overtwisting the fiber. One or more embodiments disclosed herein may include a method that can be incorporated into a continuous process.

For example, a mandrel may be used to coil artificial muscle fibers to produce coiled, linearly-actuating muscle fibers in accordance with one or more embodiments herein. Advantageously, the process is straightforward and controllable. In accordance with one or more embodiments, a pre-twisted artificial muscle fiber is carefully wound around a mandrel and secured. The artificial muscle fiber may then be annealed at that particular fiber's annealing temperature. After cooling, the artificial muscle fiber is removed from the mandrel. Importantly, the artificial muscle fiber will retain the coiled shape and may be used as a linear actuator. Because the twisted fiber may be wound in any direction around the mandrel, both homochiral and heterochiral coiled muscles may be produced in accordance with one or more embodiments disclosed herein.

One or more embodiments of the invention may include a system as illustrated in FIG. 1. A mandrel 145 is operably connected to a motor 125 that rotates the mandrel in order to coil twisted muscle fiber 135 around the mandrel. A heating means, not shown, is provided to heat the muscle fiber to a predetermined temperature. A securing means, for example a rotating belt 155, secures the muscle fiber to the mandrel. After the annealing process is complete, the coiled muscle fiber 165 is removed from the mandrel 145.

Figure 4:
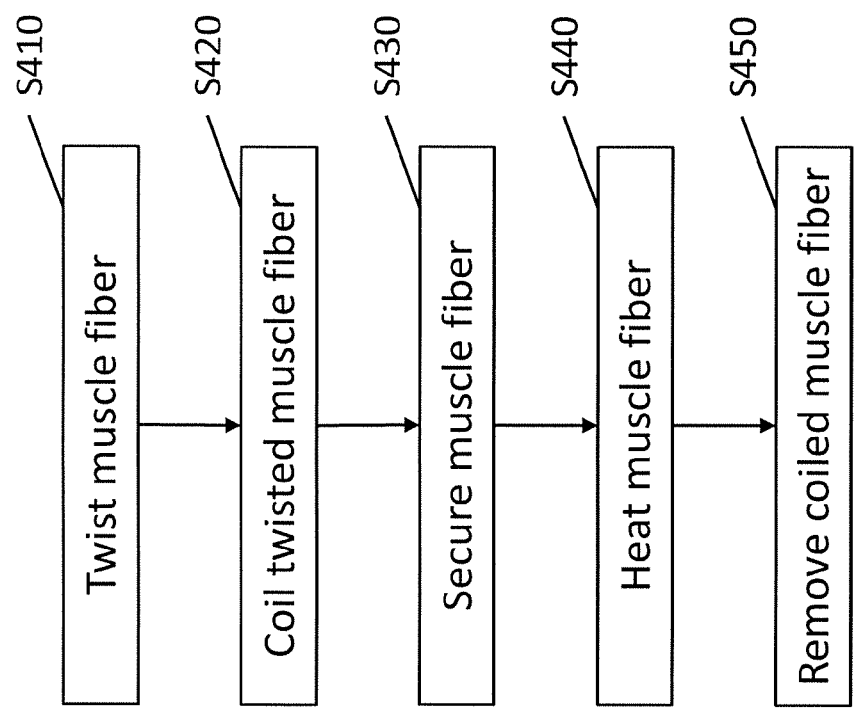
FIGS. 4 and 5 shows flow charts in accordance with one or more embodiments of the invention.

One or more embodiments of the invention may include a mandrel-based continuous method for producing a coiled artificial muscle fiber, illustrated by the flow chart in FIG. 4. Embodiments may include a mandrel 165 that has previously twisted muscle fibers (precursor muscle fibers) 135 wound onto the mandrel. The twisted-coiled fibers are then heated (S440) to a predetermined temperature by a heating means. For example, the heating means may be a heating device connected to the mandrel such that the mandrel is raised to a predetermined temperature. The coiled fibers 165 are then pulled from the end of the mandrel. One or more embodiments of the claimed invention may include a means to secure the muscle fiber onto the mandrel during production. For example, a rotating belt around the mandrel may be used to secure the muscle fiber onto the mandrel. While on the mandrel, the muscle fibers may be annealed to cause the fibers to retain their coiled shape after being removed from the mandrel in accordance with one or more embodiments disclosed herein.

One or more embodiments of the invention may include a method of producing an actuator device as illustrated by FIG. 4. A precursor muscle fiber 135 is twisted (S410) before being coiled onto the mandrel (S420). The twisted muscle fiber 135 is secured to the mandrel 165 by a securing means (S430). The twisted muscle fiber in the coiled form is heated to a predetermined temperature using a heating means (S440). The coiled muscle fibers 165 are then removed from the mandrel (S450). The steps of twisting, coiling, securing, heating and removing may be continued until the muscle fiber is a desire length.

In one or more embodiments, the actuators may include a conductive material so that the actuation may be stimulated electrically. This conductive material may be incorporated into a bundle of artificial muscle fibers or coating the individual fibers. The conductive material may be incorporated into the continuous process in accordance with embodiments disclosed herein.

In one or more embodiments, the conductive material may include a fuse to prevent damage to the artificial muscle due to excess electric current and heating. In one or more embodiments, the artificial muscle may incorporate a thermocouple to monitor the temperature of the artificial muscle.

Embodiments of the fibers used in the artificial muscle fiber actuator include, but are not limited to a polymer-based fiber. For example, nylon 6, nylon 66, polyethylene, polyvinylidene fluoride, and combinations thereof. Embodiments of the fibers may also include carbon nanotubes (CNT) based materials.

In one or more embodiments, precursor muscle fibers may be wound around a mandrel comprising an arbor wire to produce a coiled muscle fiber and the coiled muscle fiber that includes the arbor wire mandrel is wound onto a coil spool and then annealed. After the coiled muscle fiber is cooled down, the arbor wire may be removed from the coiled muscle fiber to create the coiled muscle.

Figure 2A:
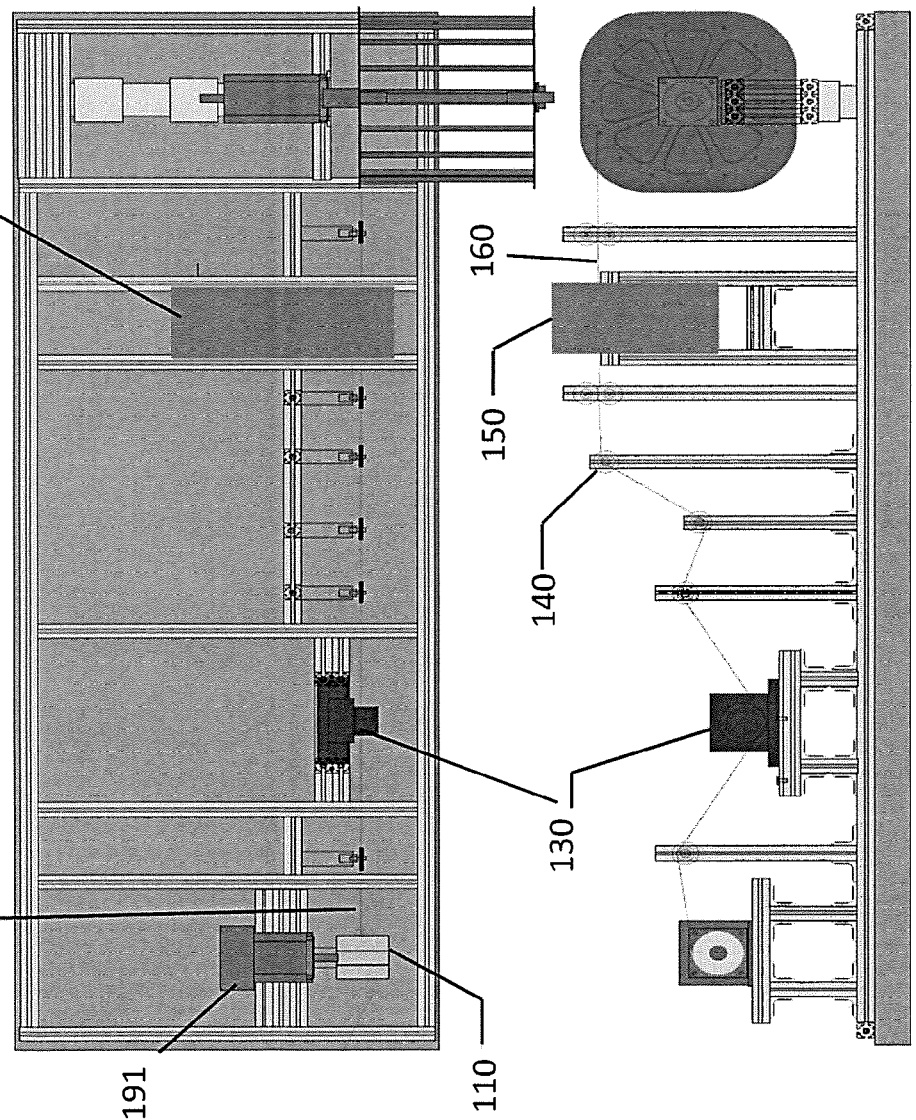
FIGS. 2A and 2B shows a diagram in accordance with one or more embodiments of the invention.
Figure 2B:
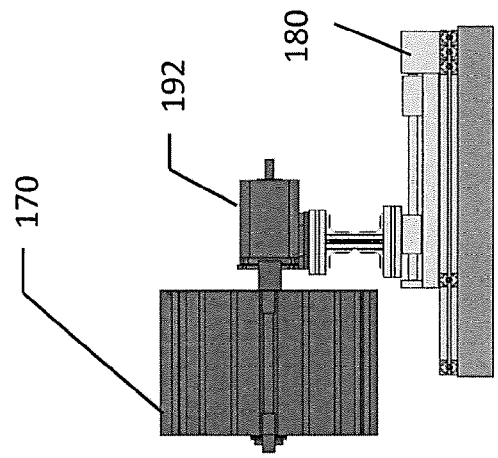

FIGS. 2A and 2B show a diagram in accordance with one or more embodiments of the invention. FIGS. 2A and 2B illustrate various view angles of the apparatus for producing the coiled muscle fiber 160 from the precursor muscle fiber, continuously and automatically. The precursor muscle fiber may include a conductive wire that is wrapped around a core fiber, which may be twisted. The conductive wire may conduct an electrical current around the core fiber to heat up the core fiber for actuation purposes. In FIG. 2B the arbor wire 120 is pulled from an arbor spool 110. In one or more embodiments, the arbor spool 110 may release the arbor wire 120 at a rate between a rate range of 1 cm/min and 50 cm/min (i.e., greater than or equal to 1 cm/min but less than or equal to 50 cm/min). The rate at which the arbor wire 120 is released may depend on the diameter of the precursor muscle fiber. In one or more embodiments, a motor 191 is operably attached to the arbor spool 110. The motor 191 may be a stepper motor. For example, the motor 191 may be a NEMA 34 motor. The precursor muscle fiber may be wrapped around the arbor wire 120 to create a coiled muscle fiber 160 with specific inner diameter.

Figure 3:
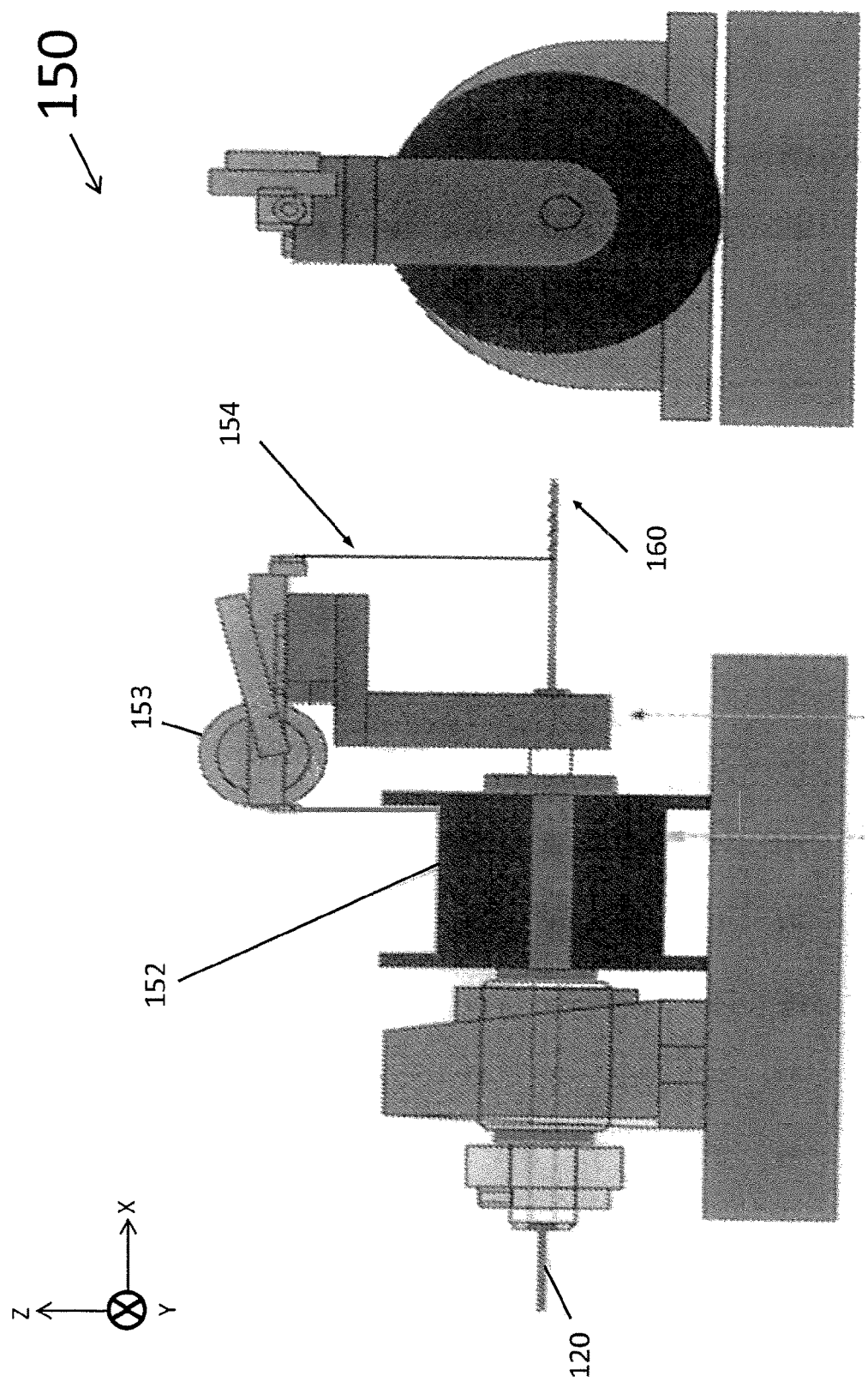
FIG. 3 shows a diagram in accordance with one or more embodiments of the invention.

In one or more embodiments, pulleys 140 may be used in order to maintain a predetermined tension on the arbor wire 120, straighten the arbor wire, and guide the arbor wire through the apparatus toward where the precursor muscle fiber may be coiled around the arbor wire. In order to monitor the tension, an arbor wire tension sensor 130 may measure and control the tension of the arbor wire 120. The load capacity of the arbor tension sensor 130 that controls the tension of the arbor wire 120 may be in a load range of 4.5 kg to 22.7 kg. Such a load creates tension in a tension range of 40 N to 220 N. If the tension is out of range (which depends on diameter of the precursor twisted and wired polymer fiber), control software may adjust the tension automatically in accordance with embodiments disclosed herein In one or more embodiments, a muscle coiling system 150 may receive the arbor wire 120, wrap the precursor muscle fibers around the arbor wire 120, and output the coiled muscle fiber 160. FIG. 3 illustrates two angles of view of the muscle coiling system 150, which includes a muscle spool 152 that may hold the precursor muscle fiber 154 and a muscle tensioner 153. In some embodiments, a stepper motor may pull the precursor muscle fiber 154 from the muscle spool 152. The rotation rate (revolution per minute (RPM)) of the muscle spool 152 is proportional to the velocity (m/min) of the arbor wire 120 divided by the diameter (m) of the precursor muscle fiber 154. The diameter of the precursor muscle fiber 154 may be considered the diameter of the core fiber plus twice the diameter of the conductive wire.

In one or more embodiments, the muscle tensioner 153 may apply and maintain a tension on the precursor muscle fiber 154 as it is wound onto the arbor wire 120. The tension of the precursor muscle fiber 154 may be 1 N to 50 N, depending on the diameter of the precursor muscle fiber 154.

The precursor muscle fiber 154, in accordance to one or more embodiments of the invention, may be a twisted fiber that may be made of a conductive wire wrapped around a core fiber. The core fiber may be any of nylon, polyethylene, polyester, polyethylene terephthalate (PET), polyethylene naphthalate (PEN), polypropylene, polyvinylidene fluoride (PVDF), polyether ether ketone (PEEK), liquid-crystal polymer (LCP), KEVLAR (aramid), VECTRAN (a multifilament yarn spun from liquid crystal polymer), carbon nanotube (CNT) yarn, and the like.

A coil spool 170 may receive and hold the coiled muscle fiber 160. In one or more embodiments, the coil spool 170 is operably attached to motor 192. For example, the Motor 192 may be a NEMA 34 stepper motor. When the coil spool 170 is filled with a desired amount of the coiled muscle fiber 160, the coil spool 170 along with the coiled muscle fiber 160 may be placed into an oven or a furnace to anneal the coiled muscle fiber 160.

In one or more embodiments of the invention, a coiled muscle fiber 160 comprising core fiber of nylon 66 is annealed at a temperature of 150° C. to 200° C. for 0.5 hr to 3 hr. For coiled muscle fibers 160 that are made of air sensitive or humidity sensitive materials such as nylon, a vacuum oven or a nitrogen-purged oven may be used.

After the coiled muscle fiber 160 is cooled down, the arbor wire 120 may be removed from the coiled muscle fiber 160. The remaining product is the coiled muscle.

According to one or more embodiments of the invention, the coil spool 170 may be approximately 11 inches in diameter and may placed on a linear stage actuator 180 that may move 10 inches. As the coil spool 170 rotates, it moves back and forth by the linear stage actuator 180 in order that the coiled muscle fiber 160 may be placed evenly along the width of the coil spool 170.

In one or more embodiments of the invention, the entire system described above may be positioned on a 2×6 ft² table top. For industrial purposes, the dimensions may be scaled up. In one or more embodiments, 100 ft of the coiled muscle fiber 160 may be coiled around one coil spool 170 in just a few hours.

Figure 5:
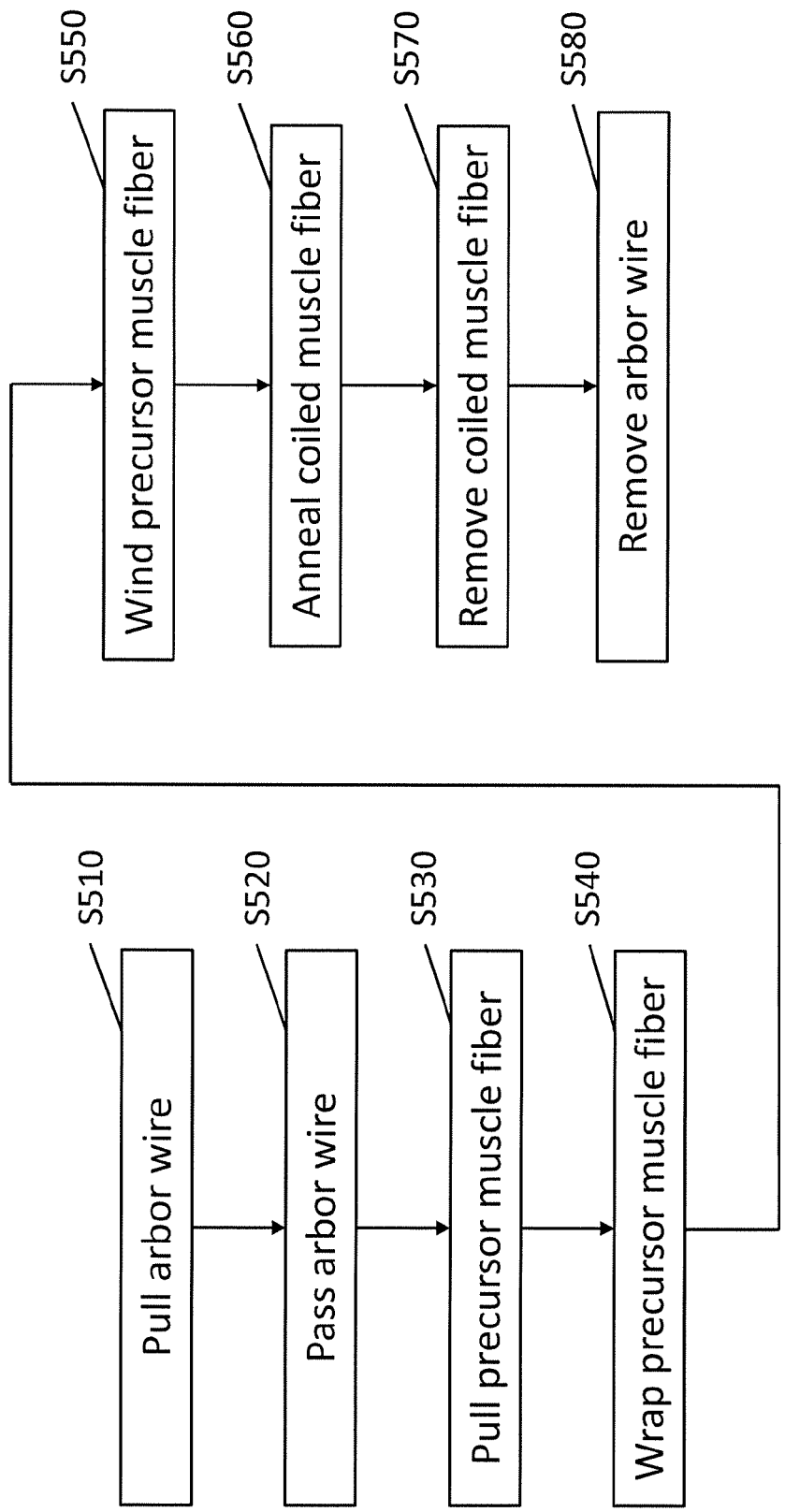

One or more embodiments of the invention may include a method as illustrated by the flow chart in FIG. 5. The method may comprise pulling an arbor wire from an arbor spool (S510), passing the arbor wire around a pulley and through an arbor tension transducer that measures a tension of the arbor wire (S520), and pulling a precursor muscle fiber from a muscle spool and through a tensioner (S530). The precursor muscle fiber may comprise a core fiber and a conductive wire wrapped around the core fiber, which may or may not be twisted. The method may further include wrapping the precursor muscle fiber around the arbor wire that has passed the arbor tension transducer to produce a coiled muscle fiber (S540), winding the coiled muscle fiber onto a coil spool (S550), annealing the coiled muscle fiber around the coil spool in an oven or a furnace (S560), removing the coiled muscle fiber around the coil spool from the oven or the furnace (S570), and removing the arbor wire from the coiled muscle fiber to create a coiled muscle (S580).

According to one or more embodiments of the invention, the arbor wire 120 must be mechanically strong to withstand bending in the pulleys 140 and be wrapped around the coil spool 170. The arbor wire 120 may be made of stainless steel, tungsten, nichrome, carbon nanotube yarn, another thermally stable and stiff polymer fiber, or combinations.

Depending on the wrapping direction of the precursor muscle fiber 154, the coiled muscle may be homochiral or heterochiral. In a homochiral muscle, the wrapping direction of the precursor muscle fiber 154 is the same as the twisting direction of the core fiber. In contrast, in a heterochiral muscle, the wrapping direction of the precursor muscle fiber 154 is opposite to the twisting direction of the core fiber. In some embodiments, the wrapping direction of the conductive wire around the twisted core fiber may be the same as the twisting direction of core fiber.

In one or more embodiments, artificial muscle fibers may be coated to protect the fibers from the environment Artificial polymer muscles lacking a protective layer may be exposed to the environment. For example, nylon, a particularly useful artificial muscle material, may be susceptible to degradation in the presence of water. Over time, nylon artificial muscle fibers may fail in such environments. Also, nylon may be sensitive to exposure to electromagnetic radiation. In order to protect the artificial muscle fiber, it may be advantageous to apply a coating onto the surface.

One or more embodiments, an actuator device that includes a first fiber, a conductive material, and a coating. The coating may protect the first fiber or the conductive material. The coating may provide moisture protection, UV protection, saline protection, and oxidation protection. The protective coating may be thermally conductive or insulating, depending on the specific function and environment of the actuator device.

In general, one or more embodiments of the invention may relate to a thin, coating in an artificial muscle to protect the artificial muscle and, in some cases, enhance the properties of the artificial muscle. In one or more embodiments disclosed herein, the actuators may include one or more fibers that are thermally driven. In one or more embodiments, the actuators may include a conductive material so that the actuation may be stimulated electrically. In other words, an applied voltage or current may provide the necessary temperature changes for actuation. One or more embodiments of the coating layer may protect the artificial muscle fiber, and may improve characteristics of the produced artificial muscle or actuator.

For example, in one or more embodiments, a black colored coating may be applied so that the artificial muscle or actuator readily absorbs radiation. Such radiation may be used in the function of the actuator. In one more embodiments of the invention, a coating may be selected that is suitable to interact closely with biological material.

As another example, in one or more embodiments the coating may be reflective. A reflective muscle may be able to maintain exposure to the Sun without heating too far above the temperature of the surrounding environment.

In one or more embodiments, a coating may be thermally conductive. In such embodiments, the coating may enable heat to be more easily whisked away from the muscle fiber, which may improve stroke efficiency, and possibly prevent any defective spots from overloading with heat. Such "hot spots" may be caused by a conductor material in the artificial muscle or actuator having imperfections along the length of the artificial muscle fiber. If such hot spots are not addressed, there is a danger that the polymer fiber along that section will heat too high and melt resulting in a failure of the muscle.

In one or more embodiments of the invention, the coating material may be designed to lend new properties to the artificial muscle fiber. In one or more embodiments of the invention, the coating material may be designed to protect the artificial muscle from environmental conditions. In one or more embodiments, the coating may serve to protect the conductor material and/or protect the polymer fiber.

In or more embodiments of the invention, the coating may be multi-functional. For example, the coating may be designed to enhance the thermal properties, provide adhesion or reduce friction, and protect from, or incorporate into, the surrounding environment. One or more embodiments of the invention may include multi-functional coatings that may be engineered for any combination of the above characteristics depending on the specific application for the artificial muscle actuator.

The coating may be designed to enhance properties of the artificial muscle or actuator in accordance with one or more embodiments disclosed herein. For example, the coating may be selected to interact well with biological material, making the artificial muscles useful for incorporation into devices in the human body. In these embodiments, care must be taken to ensure adequate thermal dissipation to prevent burn damage.

In one or more embodiments, the coating may provide electrical insulation to the conductor material and/or protect the polymer fiber. Such embodiments may be useful in artificial muscles that include a bundle of fibers forming the artificial muscle (or actuator).

In one or more embodiments, the coating may be designed to reduce surface friction. Such embodiments may also be useful in artificial muscles that include a bundle of fibers forming the artificial muscle (or actuator). For example, the low surface tension of parylene as a coating material may increase slippage between the muscle fibers within a bundle. Such embodiments may be useful in creating tighter bundles of smaller fibers.

In one or more embodiments, the coating may be designed for protection from the environment. For example, moisture protection, UV radiation protection, oxidation protection, saline solution protection, and/or high temperature protection. Embodiments of the artificial muscle or actuator that include one or more metal wires may particularly benefit from saline protection. Embodiments that include high temperature protection may also protect the external environment from the high temperature of the conductive material, and/or protect the muscle fiber from sudden changes in external temperature. Embodiments of the invention may adjust the color of the muscle to black to increase the emission of thermal radiation, which may increase the efficiency of the muscle.

For example, a thermally conductive coating may prevent the formation of "hot spots" along sections of the artificial muscle length. Flaws in a conductor included in the artificial muscle and actuator may result in too much heat being applied at one area along the muscle. As a result, irreparable damage to the artificial muscle fiber may occur if the hot spot reaches too high a temperature. A thermally conductive coating may help dissipate the heat in these hot-spots.

In one or more embodiments of the invention, the structure of the coated artificial muscle fiber may be similar to that of a real muscle fiber in that there is a protective layer coating each muscle fiber that makes up the artificial muscle. In one or more embodiments, the protective coating may also be a layer coating the entire artificial muscle or actuator. In one or more embodiments, the coating may be uniform, with no punctures or defects that may allow the external environment to directly contact the artificial muscle fiber.

Artificial muscles or actuators may include a metal wire incorporated as a conductor material. In such embodiments, it may be advantageous for the protective coating to completely cover the metal wires. It may also be necessary that the metal wires do not separate from a surface of the fiber that makes up the artificial muscle or actuator. During the coating process, care must be taken in order to not insulate the metal wire from the surface of the fiber. Such insulation may negatively affect the performance of the artificial muscle fiber.

In one or more embodiments of the invention, a selective polyurethane coating may be used on metal wires included in the artificial muscle or actuator. For example, the conductive metal wire that is incorporated into the artificial muscle fiber may be pretreated with a polymer useful for coating the muscle fibers and the wire. Then, the polymer coating of the metal wire may be further melted to coat, or partially coat, the artificial muscle fiber. In such embodiments, the coating may be primarily deposited in areas close to the metal wires, leaving some areas of the polymer muscle fiber exposed. This selective coating may be useful in protecting the wires while intentionally leaving some of the muscle fibers exposed. In one or more embodiments, the selective coating may be used in combination with another coating layer, to provide greater protection for areas closer to the conductive wires.

Various polymers may be used for the coating, for example, parylene, polyurethane, polyvinyl based polymers, and fluorinated polymers in accordance with one or more embodiments disclosed herein. In one or more embodiments, the coating may be metal. For example, gold, silver, titanium, copper, nickel, and mixtures thereof may be used. In one or more embodiments, alloys of the above metals, or for example, chromium may be used. In one or more embodiments, a metal wire incorporated into the artificial muscle may be coated with polyurethane. In one or more embodiments, the wire may be wrapped around the artificial muscle fibers and heated to melt the polyurethane to the muscle fiber surface. In such embodiments, more polyurethane may be added to completely coat the artificial muscle or actuator. In one or more embodiments, nano-composites, such as nanostructured clay in a polymer or graphene dispersed in a polymer, may be used as a coating material. Such embodiments may be advantageous for conducting heat and ensuring proper heat dissipation.

In general, the process for depositing the coating may include sputtering, electroplating, chemical vapor deposition (CVD), solution based deposition, and other techniques for producing a film or coating as known in the art. It may be necessary to coat the artificial muscle fibers after they have been twisted and/or coiled because the coating may be damaged in the twisting and/or coiling process. However, some embodiments may be coated prior to the twisting/coiling process. For example, silver coated nylon may be used in the artificial muscle fabrication to provide a coating incorporated prior to the twisting/coiling process.

In one or more embodiments, a polyurethane coated metal wire may be used as a conductor in the artificial muscle or actuator. The polyurethane on the wire may be further melted so that the polyurethane covers at least a portion of the artificial muscle fiber. Another coating of the same or different material may be subsequently applied onto the surface of the artificial muscle fiber in accordance with one or more embodiments.

In one or more embodiments, the artificial muscle device may be a hollow carbon nanotube actuating device as disclosed in U.S. Provisional Application No. 62/588,034, entitled "HOLLOW CARBON NANOTUBE ARTIFICIAL MUSCLE ACTUATING DEVICE," filed on Nov. 17, 2017.

In one or more embodiments, a hollow carbon nanotube (CNT) actuating device that includes a guest actuation material that infiltrates the plurality of CNT sheets. The bias angle of the CNTs relative to the axis of the hollow tube is controlled. The device may include additional coatings, materials, and a second yarn depending on the desired application of the actuating device.

In one or more embodiments, a mandrel may be prepared and carbon nanotube (CNT) sheets may be wrapped around the mandrel. The wrapped CNT sheets may be infiltrated with a thermally expansive polymer and/or binding agent. The mandrel may then removed resulting in the hollow CNT actuator.

In one or more embodiments, the mandrel may be low surface energy, for example, silicone. The mandrel may be any material that is coated with a low surface energy material. For example, a simple Teflon coating on a rigid metal rod may be suitable. In some cases, a solid silicone fiber may be used.

In one or more embodiments, the mandrel may have a low melting point and may be removed by melting. Common solders and tin/lead solders may be used. An important consideration is that the melting point of the mandrel be below the damage temperature of the CNTs (~480 Celsius in Air) and the polymer material (Silicone melting point=~200 Celsius). By applying the heat in a vacuum or inert atmosphere the damage temperature of the CNTs can be over 2000 Celsius. Solder mandrels may have a diameter larger than 50 micron.

In one or more embodiments, the mandrel may be etched away by a corrosive environment as a means of removal. Small diameter copper or tungsten wires may have diameters less than 5 microns, allowing for very small inner diameter yarn tubes.

Approaches used to remove a mandrel from a hollow CNT artificial muscle device may also be used to remove a mandrel In embodiments disclosed herein, a bias angle is the angle between the yarn tube central axis and the average orientation of the CNTs in the yarn. In one or more embodiments of the present invention, the bias angle is equivalent to the angle between the core fiber and the orientation of the CNTs. In other words, the bias angle is the angle of the twist in the CNT yarn. Thus, a bias angle of 0° corresponds to CNTs oriented parallel to the axis of a core fiber around which the CNT sheets are wrapped, and a bias angle of 90° corresponds to CNTs oriented perpendicular to the axis of the core fiber. For a Fermat yarn, the bias angle may be defined as:

$$\alpha = \tan-1(2\pi rT)$$

where r is the distance from yarn center and T is the inserted twist in turns per yarn length.

In one In accordance with embodiments disclosed herein, a carbon nanotube layer is comprised of a plurality of carbon nanotube (CNT) sheets stacked on top of each other. In one or more embodiments, the plurality of CNT sheets may comprise a single sheet wrapped over on itself multiple times. Such CNT sheets may be considered isotropic in accordance with embodiments disclosed herein. In one or more embodiments, these CNT sheets, when stacked on top of each other, become essentially inseparable and cannot be unwrapped. CNT layers in some cases may contain 50 CNT sheets, 100 CNT sheets, or more.

An artificial muscle device may also be referred to as a sheet muscle device, a hybrid nanofiber artificial muscle, a hybrid muscle device, a hybrid actuator, an artificial muscle actuator, or the like.

The term hybrid is used to indicate that CNT sheets are infiltrated with a guest actuation material to form one or more CNT layers, and further that the CNT layers may include other materials as well. For example, materials may include elastomers (e.g., silicone-based rubber, polyurethane, styrene-butadiene copolymer, natural rubber, and the like), fluorinated plastics (e.g., perfluoroalkoxy alkane (PFA), polytetrafluoroethylene (PTFE), fluorinated ethylene propylene (FEP), and the like), aramids, (e.g., KEVLAR, NOMEX (aromatic polyamide), and the like), epoxies, polyimides, paraffin wax, and the like.

In embodiments disclosed herein, the CNT sheets are wrapped around the mandrel so that there is an overall bias angle to the CNTS in the yarn tube. The bias angle may make it difficult to twist the yarn tube in one direction, but very easy to rotate in opposite direction. The extreme flexibility of the tubes allows for kinks to form, which enables the tubes to be used as valves in accordance with one or more embodiments disclosed herein.

In one or more embodiments disclosed herein, the CNT sheets may be wrapped around the mandrel in a fashion that ensures there is no alignment of the CNTs. In embodiments disclosed herein, the CNT sheets that are wrapped around the mandrel do not need to be initially aligned. Randomly oriented CNT sheets produced by filtration methods, or sock method, or electrospinning methods may be used in accordance with one or more embodiments. In one or more embodiments, layers of CNT sheets can be wound around the mandrel with alternating bias angles, so there is no net bias angle to the yarn tube. In these embodiments, the yarn tubes may resist twisting and avoid forming kinks.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of producing an actuator device, the method comprising:
   twisting a muscle fiber;
   coiling the twisted muscle fiber about a mandrel;
   securing the muscle fiber onto the mandrel using a rotating belt that extends around the mandrel;
   heating the muscle fiber to a predetermined temperature using a heater; and
   removing the coiled muscle fiber from the mandrel,
   wherein the twisting, coiling, securing, heating, and removing is a process that is continued until the muscle fiber is a desired length, and
   wherein the heater is operably connected to the mandrel such that the temperature of the mandrel is raised to the predetermined temperature.

2. The method of claim 1, wherein the muscle fiber comprises a polymer fiber selected from the group consisting of nylon, polyethylene, polyvinylidene fluoride, and combinations thereof.

3. The method of claim 1, wherein the muscle fiber comprises carbon nanotubes (CNT).

4. A system for continuous manufacturing of an actuator device, the system comprising:
   a mandrel operably connected to a motor;
   a rotating belt that extends around the mandrel; and
   a heater,
   wherein a twisted muscle fiber is coiled around the mandrel using the motor and secured by the rotating belt,
   wherein the heater heats the muscle fiber to a predetermined temperature, and
   wherein the heater is operably connected to the mandrel such that the temperature of the mandrel is raised to the predetermined temperature.

5. The system of claim 4, wherein the muscle fiber comprises a polymer fiber selected from the group consisting of nylon, polyethylene, polyvinylidene fluoride, and combinations thereof.

6. The system of claim 4, wherein the muscle fiber comprises carbon nanotubes (CNT).

7. An apparatus for continuously coiling artificial muscles, the apparatus comprising:
   an arbor spool;
   an arbor wire that is wound around the arbor spool, wherein the arbor spool releases the arbor wire at a rate in a rate range of 1 cm/min and 50 cm/min;
   a first motor that rotates the arbor spool;
   an arbor tension sensor that:
      measures tension on the arbor wire as the arbor wire is released out of the arbor spool, and
      automatically adjusts the tension on the arbor wire in response to sensing that the tension on the arbor wire is out of the load range;
   a plurality of pulleys that apply the tension on the arbor wire;
   a precursor muscle fiber comprising:
      a core fiber; and
      a conductive wire twisted and wrapped around the core fiber;
   a muscle spool that holds the precursor muscle fiber, wherein a round-per-minute rate of the muscle spool is proportional to a velocity of the arbor wire divided by a diameter of the precursor muscle fiber;
   a second motor that pulls the precursor muscle fiber from the muscle spool;
   a muscle tensioner that maintains tension on the precursor muscle fiber as the precursor muscle fiber is being wound around the arbor wire, wherein the tension on the precursor muscle fiber is in a tension range of 1 N to 50 N;
   a coil spool that holds the arbor wire after the precursor muscle fiber has been wrapped around the arbor wire;
   a third motor that rotates the coil spool;
   a linear stage actuator that moves the coil spool back and forth and evenly places the arbor wire along a width of the coil spool; and
   an oven or a furnace for annealing the coil spool along with the precursor muscle fiber wrapped around the arbor wire,
   wherein the core fiber may be a twisted core fiber or an untwisted core fiber, and
   wherein the apparatus coils the precursor muscle fiber around the arbor wire.

8. The apparatus of claim 7, wherein the arbor wire is selected from the group consisting of stainless steel, tungsten, nichrome, carbon nanotube yarn, and combinations thereof.

9. The apparatus of claim 7, wherein the core fiber is selected from the group consisting of nylon, polyethylene, polyester, polyethylene terephthalate (PET), polyethylene naphthalate (PEN), polypropylene, polyvinylidene fluoride (PVDF), polyether ether ketone (PEEK), liquid-crystal polymer (LCP), aramid, a multifilament yarn spun from liquid crystal polymer, carbon nanotube yarn, and combinations thereof.

10. The apparatus of claim 7, wherein
    the core fiber is nylon,
    the annealing is at a temperature in a temperature range of 150° C. to 200° C.,
    the annealing is for a time in a time range of 0.5 hr to 3 hr.

11. A method for manufacturing a coiled muscle, the method comprising:
- pulling an arbor wire from an arbor spool;
- passing the arbor wire around a pulley and through an arbor tension transducer that measures a tension of the arbor wire;
- pulling a precursor muscle fiber from a muscle spool and through a tensioner, the precursor muscle fiber comprising:
  - a core fiber; and
  - a conductive wire wrapped around the core fiber;
- wrapping the precursor muscle fiber around the arbor wire that has passed the arbor tension transducer to produce a coiled muscle fiber;
- winding the coiled muscle fiber onto a coil spool;
- annealing the coiled muscle fiber around the coil spool in an oven or a furnace;
- removing the coiled muscle fiber around the coil spool from the oven or the furnace; and
- removing the arbor wire from the coiled muscle fiber to create a coiled muscle,
- wherein the core fiber may be a twisted core fiber or an untwisted core fiber,
- wherein a round-per-minute rate of the muscle spool is proportional to a velocity of the arbor wire divided by a diameter of the precursor muscle fiber.

12. The method of claim 11, wherein the arbor wire is any of stainless steel, tungsten, nichrome, or carbon nanotube yarn.

13. The method of claim 11, wherein the core fiber is selected from the group consisting of nylon, polyethylene, polyester, polyethylene terephthalate (PET), polyethylene naphthalate (PEN), polypropylene, polyvinylidene fluoride (PVDF), polyether ether ketone (PEEK), liquid-crystal polymer (LCP), aramid, a multifilament yarn spun from liquid crystal polymer, carbon nanotube yarn, and combinations thereof.

14. The method of claim 11, wherein
- the core fiber is nylon,
- the annealing is at a temperature in a temperature range of 150° C. to 200° C., and
- the annealing is for a time in a time range of 0.5 hr to 3 hr.

15. The method of claim 11, wherein the core fiber is the twisted core fiber and the coiled muscle is homochiral and a direction of wrapping the precursor muscle fiber around the arbor wire is same as a direction of twisting the core fiber and a direction of wrapping the conductive wire around the core fiber.

16. The method of claim 11, wherein the core fiber is the twisted core fiber and the coiled muscle is heterochiral and a direction of wrapping the precursor muscle fiber around the arbor wire is opposite to a direction of twisting the core fiber and a direction of wrapping the conductive wire around the core fiber.

* * * * *